United States Patent
Shikata

(10) Patent No.: US 7,688,462 B2
(45) Date of Patent: Mar. 30, 2010

(54) COMPUTER READABLE RECORDING MEDIUM STORING PRINTER DRIVE PROGRAM

(75) Inventor: Yukiko Shikata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1329 days.

(21) Appl. No.: 10/977,124

(22) Filed: Oct. 29, 2004

(65) Prior Publication Data

US 2005/0149950 A1 Jul. 7, 2005

(30) Foreign Application Priority Data

Oct. 31, 2003 (JP) ............................ P2003-371581

(51) Int. Cl.
*G06F 3/12* (2006.01)
*G06K 15/00* (2006.01)

(52) U.S. Cl. ..................................... 358/1.15; 358/1.13

(58) Field of Classification Search ................ 358/1.15, 358/1.14, 1.13, 1.16, 1.18, 1.1, 1.6, 1.9, 1.2, 358/1.11, 407, 468, 437; 347/2, 3, 5, 14, 347/23; 715/229, 736; 399/1, 8; 709/224, 709/218, 203; 710/8, 11, 14, 15, 17, 18, 710/19, 62, 64, 72; 719/321, 327

See application file for complete search history.

(56) References Cited

U.S. PATENT DOCUMENTS

| 7,444,394 B2 | 10/2008 | Igarashi et al. |
| 2003/0131072 A1* | 7/2003 | Kobayashi ................... 709/218 |
| 2007/0204029 A1 | 8/2007 | Igarashi et al. |

FOREIGN PATENT DOCUMENTS

| JP | 10283287 A | 10/1998 |
| JP | 11212742 A | 8/1999 |
| JP | 2000-255139 | 9/2000 |
| JP | 2002-278735 | 9/2002 |
| JP | 2002278735 A * | 9/2002 |

* cited by examiner

*Primary Examiner*—Dov Popovici
(74) *Attorney, Agent, or Firm*—Hogan & Hartson LLP

(57) ABSTRACT

A computer readable recording medium stores a printer driver program to be installed in a computer in order to use a printer. The printer driver program includes a grasping processing for grasping version information of various kinds of printer related programs for executing a processing as to the printer, installed in the computer; and a version information displaying processing for, when a predetermined version information displaying instruction is input, displaying version information of the printer driver program together with version information of the printer related programs grasped by the grasping processing.

3 Claims, 7 Drawing Sheets

COMPUTER READABLE RECORDING MEDIUM STORING PRINTER DRIVE PROGRAM

BACKGROUND OF THE INVENTION

The present invention relates to a computer readable recording medium storing a printer driver program which is installed into a computer in order to use a printer.

As is well known, some kinds of printers having been on the market are each provided with a driver program for making the printer perform a printing operation and a monitor program for monitoring the operating state of the printer. Each of these programs is upgraded in its version at each program module constituting the program. Thus, each of the driver program and the monitor program for the printer is arranged (programmed) so as to be able to display the version information of the respective program modules of these programs.

However, in the existing driver program and monitor program, when a user wants to know various kinds of version information relating to the respective programs installed in a user's computer, the user is required to repeatedly input instructions by using a mouse etc. thereby to start the driver program to display the version information relating to the driver program and thereafter to start the monitor program to display the version information relating to the monitor program.

SUMMARY OF THE INVENTION

Accordingly, an object of the invention is to provide a printer driver program which can display, through an easier operation, the version information of the printer driver program and the version information of other program such as a monitor program prepared for the same printer as the printer driver program which is stored in the computer readable recording medium.

In order to solve the aforesaid problem, according to the invention, a computer recording medium storing the printer driver program to be installed in a computer in order to use a printer is prepared (programmed) so as to execute the following processings by a computer:

(a) a gasping processing for grasping version information of various kinds of printer related programs, installed in the computer, for executing a processing as to the printer; and (b) a version information displaying processing for, when a predetermined version information displaying instruction is input, displaying version information of the printer driver program together with version information of the printer related programs grasped by the gasping processing.

According to the computer in which the printer driver program according to the invention is installed, when the version information displaying instruction is input, both the version information of the printer driver program and the version information of the various kinds of printer related programs are displayed simultaneously. Thus, by using the printer driver program, the driver version information (that is, the version information of the printer driver program) and the version information of other program using the same printer can be display through an easier operation.

Incidentally, at the time of preparing the printer driver program according to the invention, the grasping processing may be performed at the time of starting the version information displaying processing or at the time of starting the printer driver program.

Further, the printer driver program according to another aspect of the invention is prepared (programmed) so as to execute the following processings by a computer:

(a) a checking processing for checking whether or not a monitor program is installed in the computer, the monitor program providing the computer with a monitoring function of monitoring an operating state of the printer and a monitor program version information displaying function of displaying version information of the printer driver program; and (b) a version information displaying processing for, in a case where a predetermined version information displaying instruction is input, when the checking result of the checking processing indicates that the monitor program is installed in the computer, displaying the version information of the printer driver program, then for shifting to a state of waiting for input of a termination instruction of the display of the version information of the printer driver program or an instruction for displaying the version information of the monitor program, and for displaying the version information of the monitor program by using the monitor program version information displaying function when an instruction for displaying the version information of the monitor program is input.

According to the computer in which the printer driver program according to the another aspect of the invention is installed, the version information of the printer driver program is displayed when the version information displaying instruction is input, and the version information of the monitor program is displayed when the version information displaying instruction for the monitor program is input in this state. In the conventional technique, the version information of the monitor program can not be displayed unless the monitor program is started. Thus, by using the printer driver program, the driver version information (that is, the version information of the printer driver program) and the version information of the monitor program using the same printer can be display through an easier operation.

Incidentally, also at the time of preparing the printer driver program according to this another aspect of the invention, the grasping processing may be performed at the time of starting the version information displaying processing or at the time of starting the printer driver program. Further, as the version information of the monitor program, the version information group of plural program modules constituting the monitor program may be displayed.

Further, the printer driver program according to the another aspect of the invention can be prepared in a manner that the version information displaying processing, when the checking result of the checking processing indicates that the monitor program is installed in the computer, displays a first dialog box in which the version information of the printer driver program is displayed and a display instruction item is provided which is arranged in a manner that an operation with respect to the display instruction item is treated as the instruction for displaying the version information of the monitor program, and when the checking result of the checking processing indicates that the monitor program is not installed in the computer, displays a second dialog box which is arranged to have the same configuration as the first dialog box and inactivate the display instruction item.

DETAILED DESCRIPTION OF PREFERRED EMBODIMENTS

Embodiments according to the present invention will be explained in detail with reference to the accompanying drawings.

First Embodiment

First, the gist of a printer driver program 10 according to the first embodiment of the invention will be explained with reference to FIGS. 1 and 2.

Figure 1:
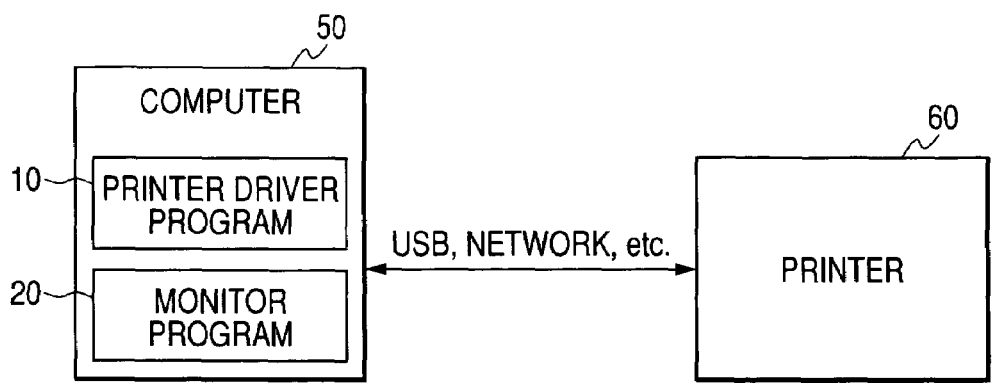
FIG. 1 is a diagram for explaining the using state of a printer driver program according to the first embodiment.

As shown in FIG. 1, the printer driver program 10 according to the embodiment is a program to be installed in a computer 50 connected to a printer 60. Usually, a monitor program 20 for monitoring the operating state of the printer 60 is also installed in the computer 50 in which the printer driver program 10 is installed.

These programs can be installed in the computer via Internet, CD-ROM and any computer readable recording medium. Needless to say, the programs may be preliminary installed in the computer.

Figure 2:
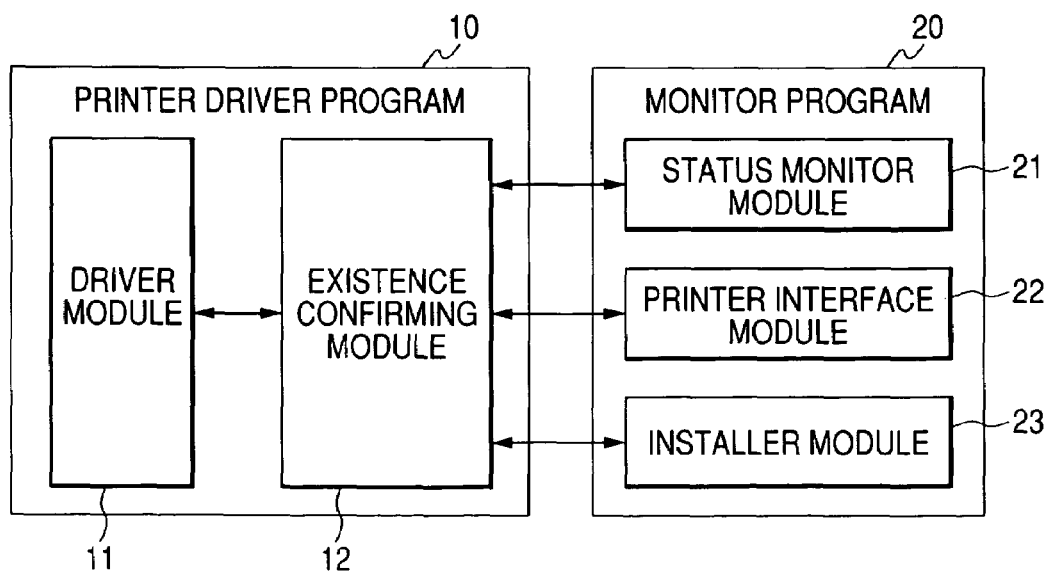
FIG. 2 is a diagram for explaining the configuration of the printer driver program and a monitor program 20 according to the first embodiment.

As shown in FIG. 2, the printer driver program 10 according to the embodiment is constituted by a driver module 11, an existence confirming module 12 etc. Further, the monitor program 20 is constituted by a status monitor module 21, a printer interface module 22, an installer module 23 etc. In this figure, arrows are shown between the respective modules between which data relating to the version information is communicated (detailed explanation thereof will be made later).

The driver module 11, which is a constituent element of the printer driver program 10, is a program for making the computer 50 perform a processing of generating print data to be supplied to the computer 50 and a processing of displaying a printer property dialog box. The existence confirming module 12 is a program (a DLL (Dynamic Link Library) in this embodiment) for making the computer 50 perform a processing of confirming the installing state of the monitor program 20 and a processing of grasping the version information of the respective modules of the monitor program 20 (that is, a function of obtaining the version information from the respective modules of the monitor program 20).

The status monitor module 21 is a program for making the computer 50 perform a processing of monitoring the operating state of the printer 60 and a processing of displaying a window showing the monitored result (the operating state of the printer 60). The status monitor module 21 has a function of responding to an inquiry about the version information from other program (existence confirming program 12) (that is, a function of outputting the version information of its own program as a response to an inquiry). The status monitor module 21 is a program in which the version information is stored in another file.

The printer interface module 22 is a program which is used by the status monitor module 21 when the status monitor module communicates with the printer 60. The printer interface module 22 also has a function of responding to an inquiry about the version information from other program.

The installer module 23 is a program having a function of installing the printer interface module 22 into the computer 50 and a function of responding to an inquiry about the version information from other program. The former function of the installer module 23 is utilized only at the time of installing the monitor program 20.

Explanation will be made as to the operation of the printer driver program 10 according to the embodiment on the assumption of the aforesaid matter.

Figure 3:
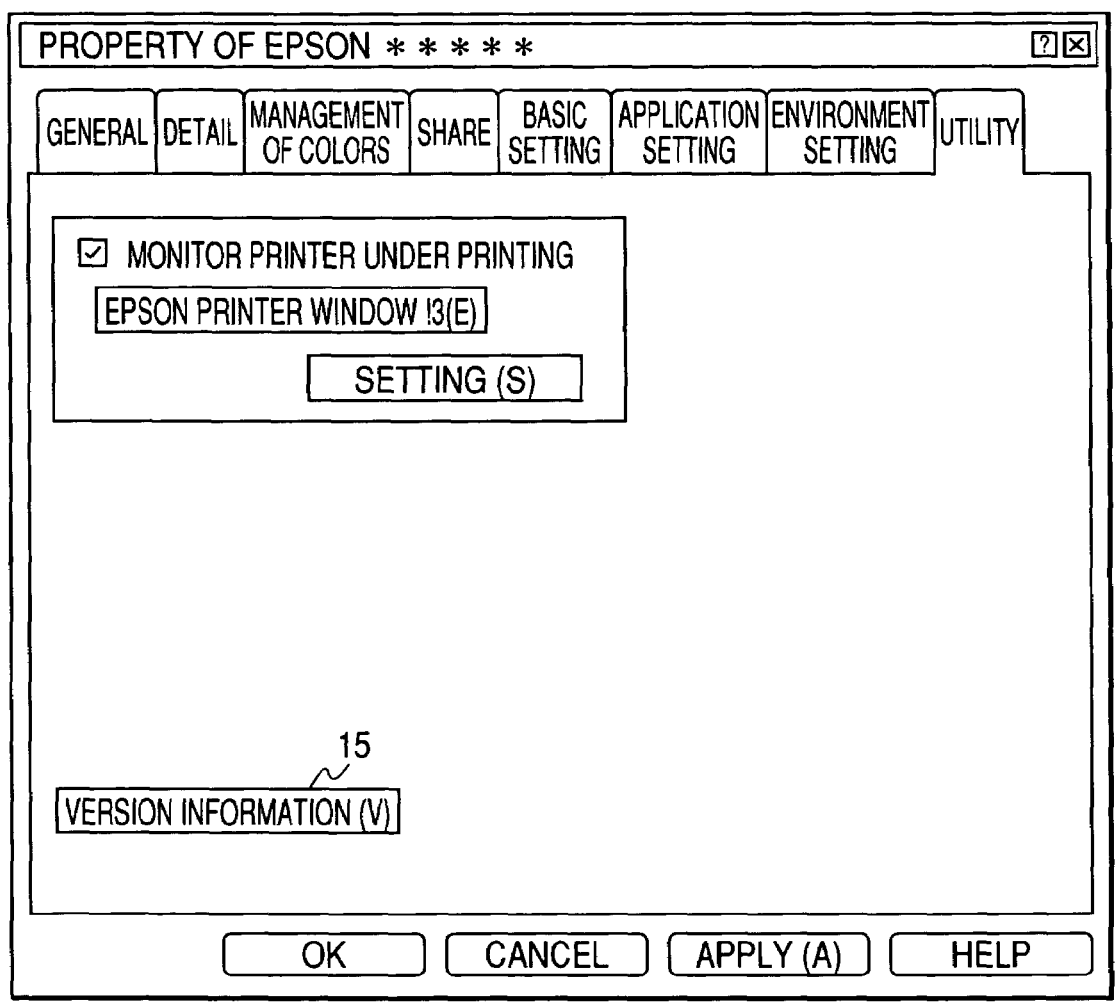
FIG. 3 is a diagram for explaining a printer property dialog box which is displayed by the printer driver program (driver module) according to the first embodiment.

When a predetermined operation is made in the computer 50 in which the printer driver program 10 (the driver module 11) is installed, the computer displays on a display a printer property dialog box as shown in FIG. 3.

Figure 4:
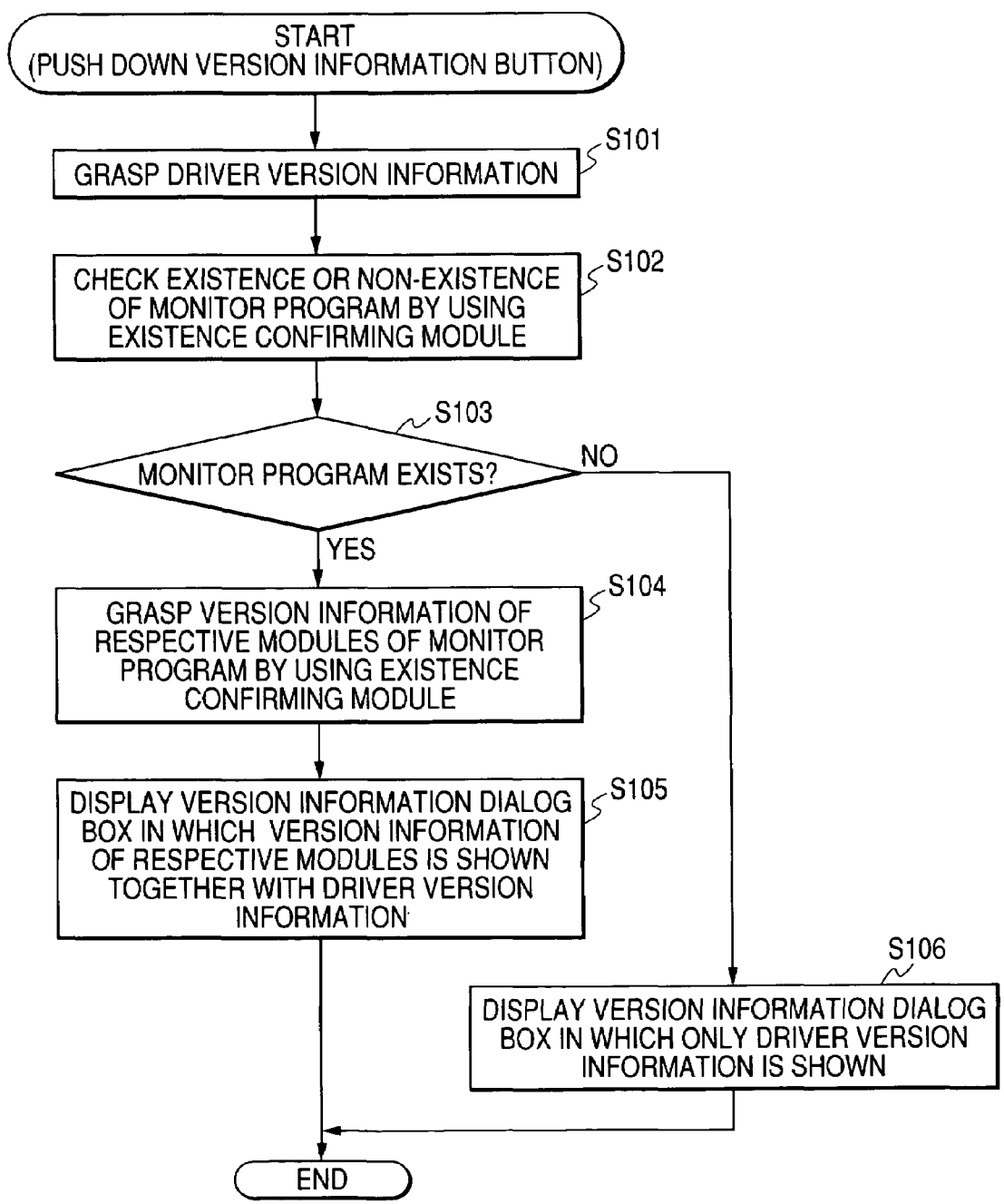
FIG. 4 is a flowchart showing processings executed by the printer driver program (driver module) according to the first embodiment.

When a version information button 15 on the property dialog box is pushed down (clicked) (or when a keyboard operation corresponding to this push-down operation is made: which corresponds to "when a predetermined version information display instruction is input" of claim 1), the computer 50 (the driver module 11) starts a procedure shown in FIG. 4.

That is, the computer 50 (the driver module 11) firstly grasps the driver version information (the version information of the driver module 11) (step S101).

Next, the computer 50 checks by using the existence confirming module 12 whether or not the monitor program 20 is installed (step S102). To be more concrete, in step S102, when the existence confirming module 12 receives a predetermined request from the driver module 11, the existence confirming program checks the existence or non-existence of the monitor program 20 and notifies the result of the checking to the driver module 11.

Figure 5:
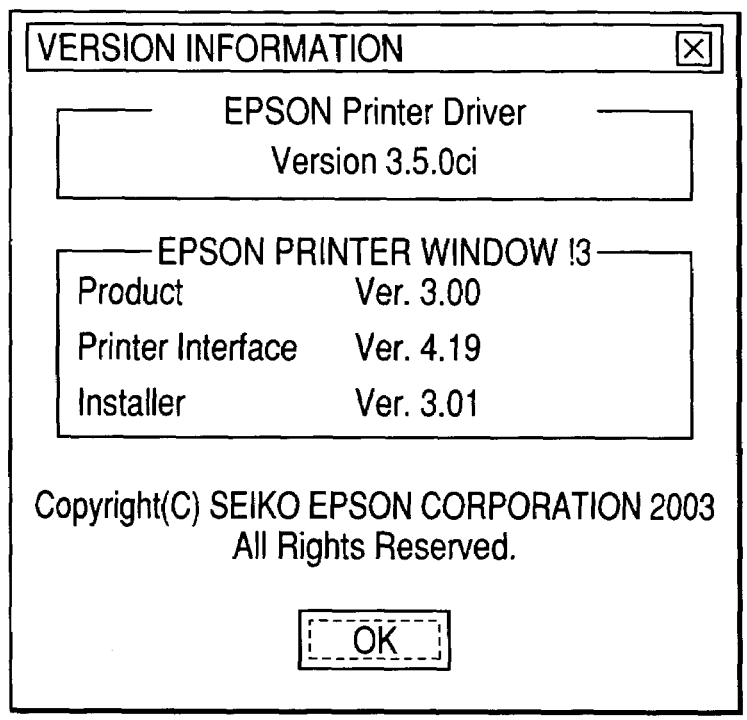
FIG. 5 is a diagram for explaining aversion information dialog box displayed by the printer driver program (driver module) according to the first embodiment.

Thus, when it is determined that the monitor program 20 is installed (Yes at steps S103), the computer 50 grasps the version information of the respective modules (programs) constituting the monitor program 20 by using the existence confirming module 12 (step S104: corresponding to "a grasping processing" of claim 1). Next, the computer 50 displays the version information dialog box as shown in FIG. 5 in which the version information of the respective modules of the monitor program 20 is shown together with the driver version information (step S105: corresponding to "a version information displaying processing" of claim 1). "Version 3.5.0. ci" shown in the version information dialog box is the driver version information, and "Ver. 3.00", "Ver. 4.19" and "Ver. 3.01" in the version information dialog box are the version information of the status monitor module 21, the printer interface module 22 and the installer module 23, respectively.

Then, when an "OK" button on the version information dialog box is pushed down, the computer 50 erases the version information dialog box and then terminates the processing of step S105 and also terminates the processing of FIG. 4.

On the other hand, when it is determined that the monitor program 20 is not installed (No at steps S103), the computer 50 displays a version information dialog box in which only the driver version information is shown (step S106). The version information dialog box displayed in step S106 is a box in which the respective information within a box entitled "EPSON printer window !3" shown in FIG. 5 is displayed in a gray out manner.

Then, when the "OK" button on the version information dialog box is pushed down, the computer 50 erases the version information dialog box and then terminates the processing of step S105 and also terminates the processing of FIG. 4.

As explained above, the printer driver program 10 according to the first embodiment is arranged so as to be able to display at the computer the version information dialog box (see FIG. 5) in which the version information of the printer driver program and the version information of the respective modules (programs) constituting the monitor program is shown. Thus, the versions of the various kinds of programs can be confirmed easily (in a short time) as compared with the conventional technique, by using the printer driver program 10.

Second Embodiment

Hereinafter, the constitution and operation of the printer driver program 10' according to a second embodiment of the invention will be explained with reference to FIGS. 6 to 10.

Figure 6:
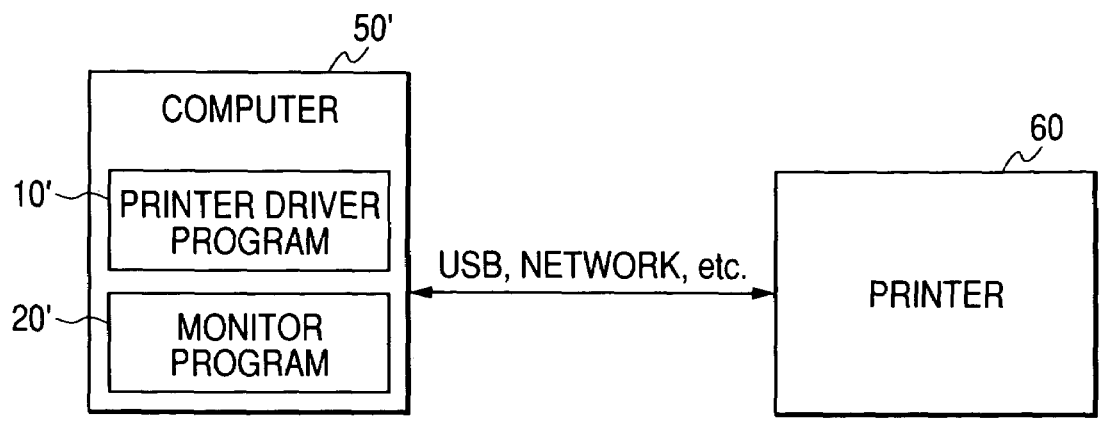
FIG. 6 is a diagram for explaining the using state of a printer driver program according to the second embodiment.

As shown in FIG. 6, like the printer driver program 10 according to the first embodiment, usually, a printer driver program 10' according to the second embodiment is also a program used in a state of being installed in the computer 50' together with a monitor program 20'.

Figure 7:
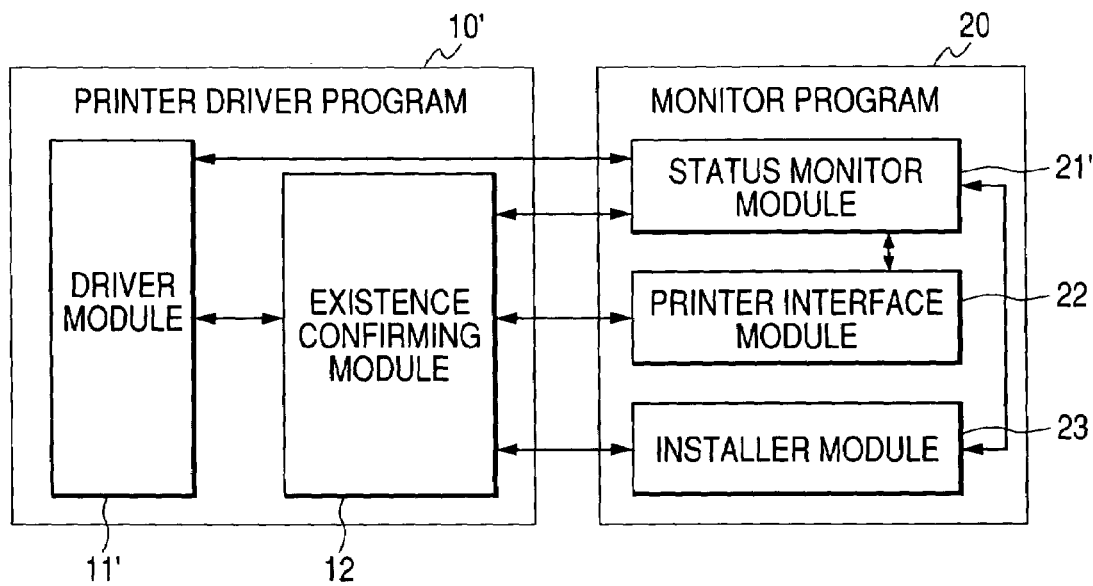
FIG. 7 is a diagram for explaining the configuration of the printer driver program and a monitor program according to the second embodiment.

As shown in FIG. 7, the printer driver program 10' according to this embodiment is constituted by a driver module 11', an existence confirming module 12 etc. The monitor program 20' used together with the printer driver program 10' is constituted by a status monitor module 21', a printer interface module 22, an installer module 23 etc.

The existence confirming module 12, the printer interface module 22 and the installer module 23 according to the second embodiment are same as the modules of the same name (the same reference numerals) of the first embodiment.

Figure 8:
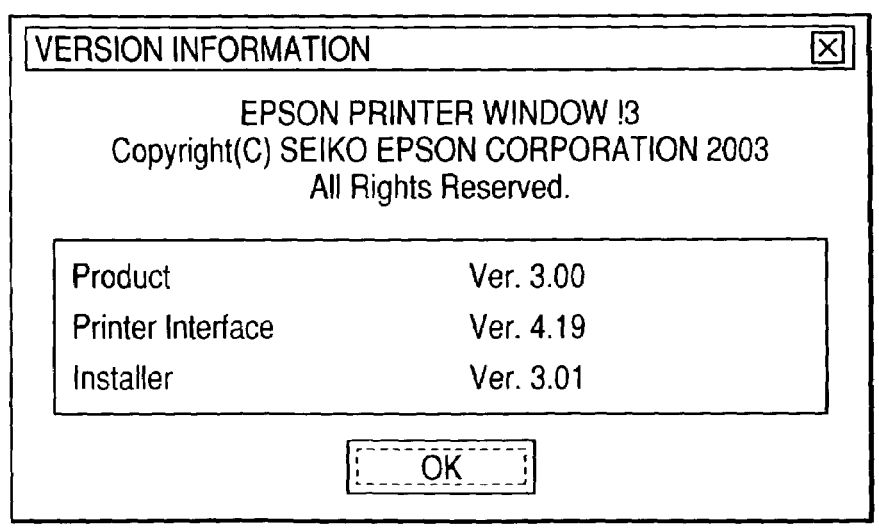
FIG. 8 is a diagram for explaining a printer property dialog box which is displayed by the printer driver program (status monitor module) according to the second embodiment.

On the other hand, the status monitor module 21' is the same program as the status monitor module 21 in its essential function but is arranged to be a program which can make the computer 50' perform a processing of obtaining version information from each of other modules constituting the monitor program 20' and displaying (not accompanying by displaying a main window) a monitor version information dialog box as shown in FIG. 8.

The driver module 11' (the printer driver program 10') is a program for displaying a printer property dialog box (see FIG. 3) having the same configuration as that of the driver module 11 according to the first embodiment. However, this diver module is arrange in a manner that when a version information button 15 on the property dialog box is pushed down (clicked) (or when a keyboard operation corresponding to this push-down operation is made), the computer 50' starts a procedure shown in FIG. 9.

That is, when the computer 50' (the driver module 11') detects the push-down operation of the version information button 15, the computer firstly grasps the driver version information (the version information of the driver module 11') (step S201). Next, the computer 50' checks by using the existence confirming module 12 whether or not the monitor program 20' is installed (step S202: corresponding to "a checking processing" of claim 2).

Figure 10:
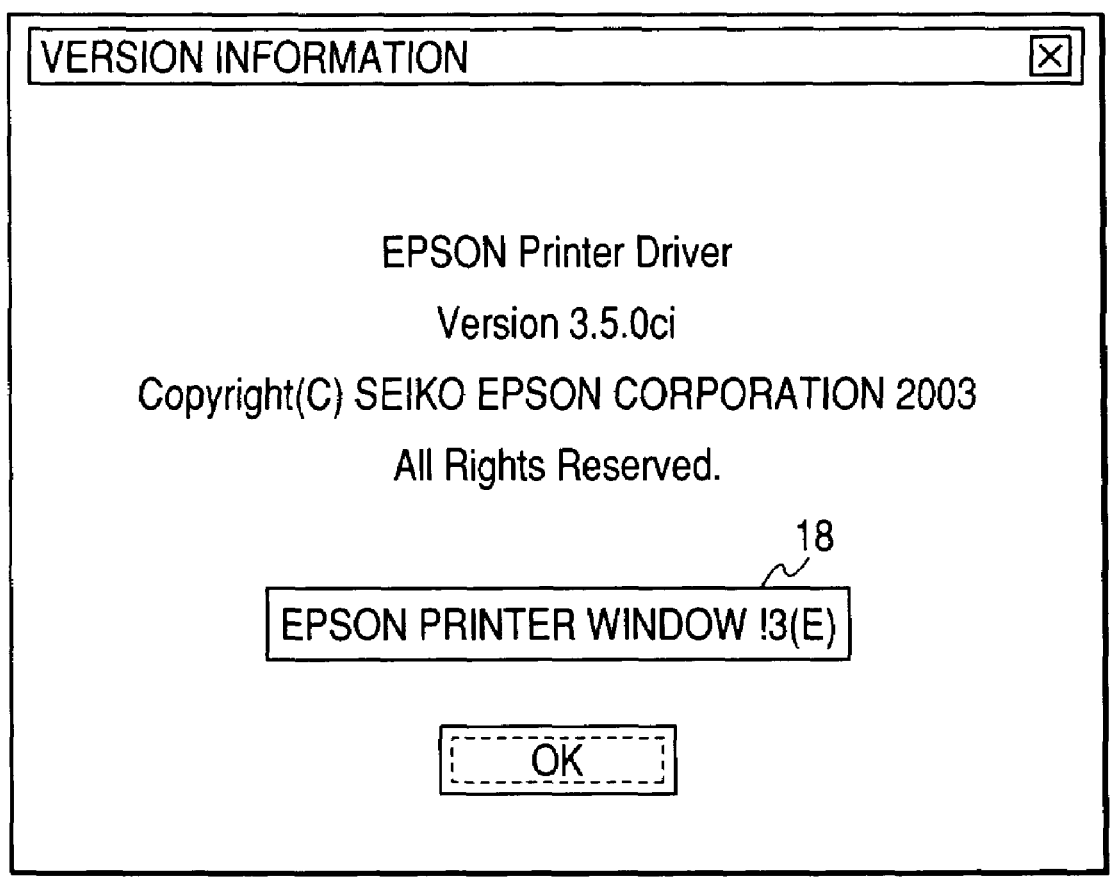
FIG. 10 is a diagram for explaining a driver version information dialog box displayed by the printer driver program (driver module) according to the second embodiment.

Then, when it is determined that the monitor program 20' is installed (Yes at steps S203), the computer 50' displays a driver version information dialog box configured as shown in FIG. 10 (step S204). That is, the computer 50' displays the driver version information dialog box in which the driver version information ("Ver. 3.5.0ci") is shown and a monitor version information button 18 is provided. In this embodiment, the driver version information dialog box corresponds to first and second dialog boxes of claim 3 and the processings at steps S204 to S206 correspond to a version information displaying processing of claims 2 and 3.

Figure 9:
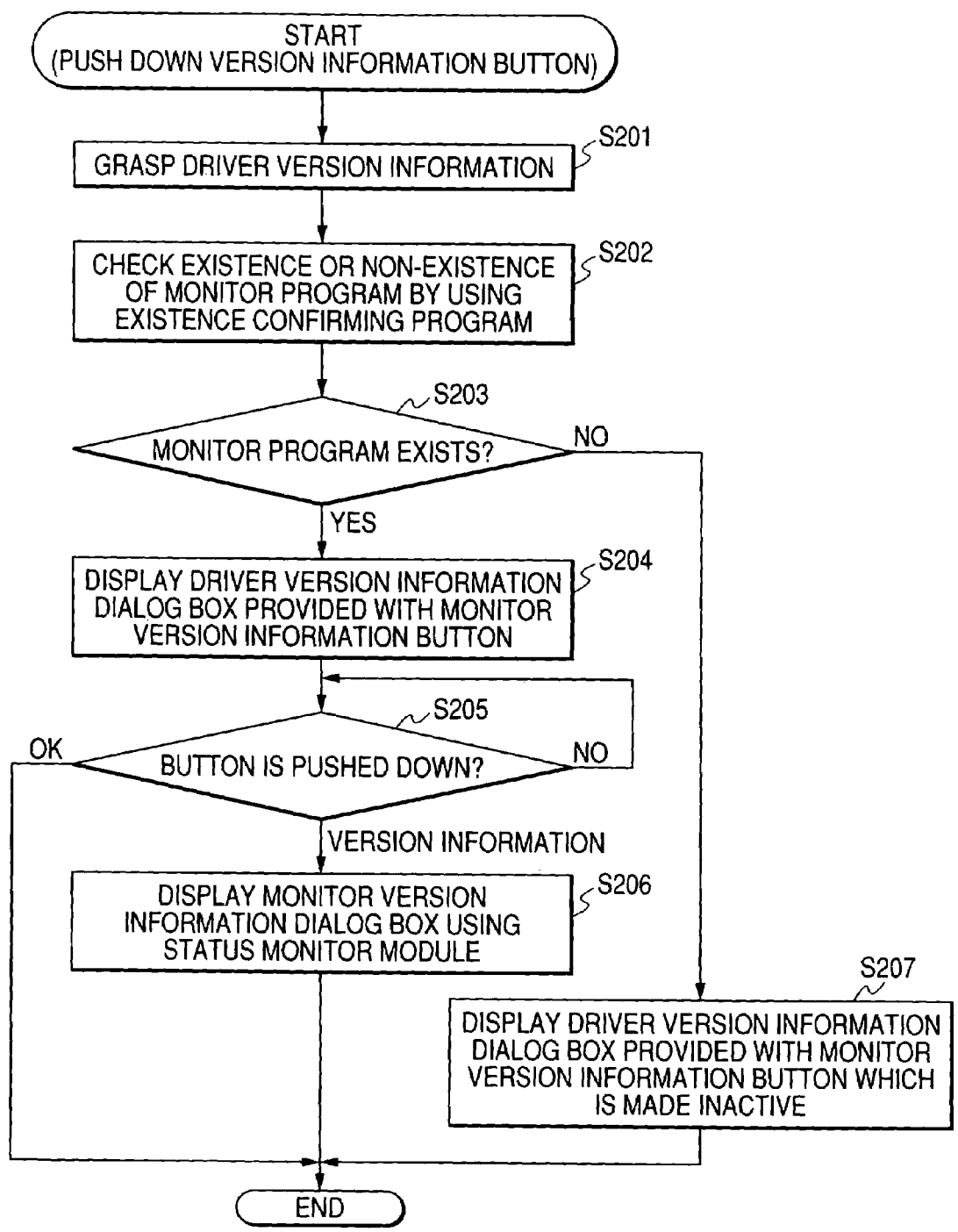
FIG. 9 is a flowchart showing processings executed by the printer driver program (driver module) according to the second embodiment.

Then, the computer 50' waits for an "OK button" and the monitor version information button 18 on the driver version information dialog box to be pushed down (step S205 of FIG. 9). When the "OK button" is pushed down (OK at step S205), the computer erases the driver version information dialog box (not shown) and then terminates the processing of this figure.

When the monitor version information button 18 is pushed down ("version information" at step S205), the computer 50' displays a monitor version information dialog box by using the status monitor module 21' (step S206). In brief, in step S206, the driver module 11' issues an instruction of displaying the monitor version information dialog box to the status monitor module 21', and so the status monitor module 21' displays the monitor version information dialog box (see FIG. 8) in response to the display instruction.

Then, when the "OK" button on the monitor version information dialog box is pushed down, the computer 50' erases the monitor version information dialog box and then terminates the processing of step S206 and also terminates the processing of this figure.

On the other hand, when it is determined that the monitor program 20' is not installed (No at steps S203), the computer 50' displays a driver version information dialog box in which the monitor version information button 18 is made inactive (step S207) Then, when the "OK button" on the driver version information dialog box is pushed down, the computer 50' erases the driver version information dialog box and then terminates the processing of step S207 and also terminates the processing of this figure.

As explained above, the driver version information dialog box (see FIG. 10) displayed by the printer driver program 10' according to the second embodiment is provided with the monitor version information button 18 which is arranged to display the version information of the respective modules (programs) constituting the monitor program 20' when the monitor version information button is pushed down. Thus, the versions of the various kinds of programs can be confirmed easily (in a short time) as compared with the conventional technique, also by using the printer driver program 10'.

MODIFIED EXAMPLE

The printer driver programs 10, 10' according to the first and second embodiments may be modified in various manners. For example, each of the driver modules 11, 11' may be modified so as to also have a function as the existence confirming module 12. Further, although each of the printer driver programs 10, 10' is arranged to grasp the version information relating to the monitor program 20, 20' when a user instructs the display of the version information (that is, when the version information button 15 is pushed down), each of the printer driver programs 10, 10' may be modified so as to grasp the version information relating to the monitor program 20, 20' when the driver program is started.

Each of the monitor programs 20, 20' may be arranged to have a module configuration different from the aforesaid configuration. Further, since the programs which version information is displayed by each of the printer driver programs 10, 10' may only be ones using the printer 60, each of the printer driver programs 10, 10' may be arranged to display the version information of other printer driver program which generates special print data for the printer 60, for example.

What is claimed is:

1. A computer readable recording medium storing a printer driver program to be installed in a computer in order to use a printer, the printer driver program comprising:
    a grasping processing for grasping version information of various kinds of printer related programs already installed in the computer for executing a processing as to the printer; and
    a version information displaying processing for, when a predetermined version information displaying instruction is input, displaying version information of the printer driver program together with version information of the printer related programs grasped by the grasping processing.

2. A computer readable recording medium storing a printer driver program to be installed in a computer in order to use a printer, the printer driver program comprising:
    a checking processing for checking whether or not a monitor program is installed in the computer, the monitor program providing the computer with a monitoring function of monitoring an operating state of the printer and a monitor program version information displaying function of displaying version information of a printer driver program already installed in the computer; and
    a version information displaying processing for, in a case where a predetermined version information displaying instruction is input, when the checking result of the checking processing indicates that the monitor program is installed in the computer, displaying the version information of the printer driver program already installed in the computer, then shifting to a state of waiting for input of a termination instruction of the display of the version information of the printer driver program or an instruction for displaying the version information of the monitor program, and displaying the version information of the monitor program by using the monitor program version information displaying function when the instruction for displaying the version information of the monitor program is input.

3. A computer readable recording medium according to claim 2, wherein
    the version information displaying processing, when the checking result of the checking processing indicates that the monitor program is installed in the computer, displays a first dialog box in which the version information of the printer driver program already installed in the computer is displayed and a display instruction item is provided which is arranged in a manner that an operation with respect to the display instruction item is treated as the instruction for displaying the version information of the monitor program, and, when the checking result of the checking processing indicates that the monitor program is not installed in the computer, displays a second dialog box which is arranged to have the same configuration as the first dialog box and inactivate the display instruction item.

* * * * *